Figure 1:
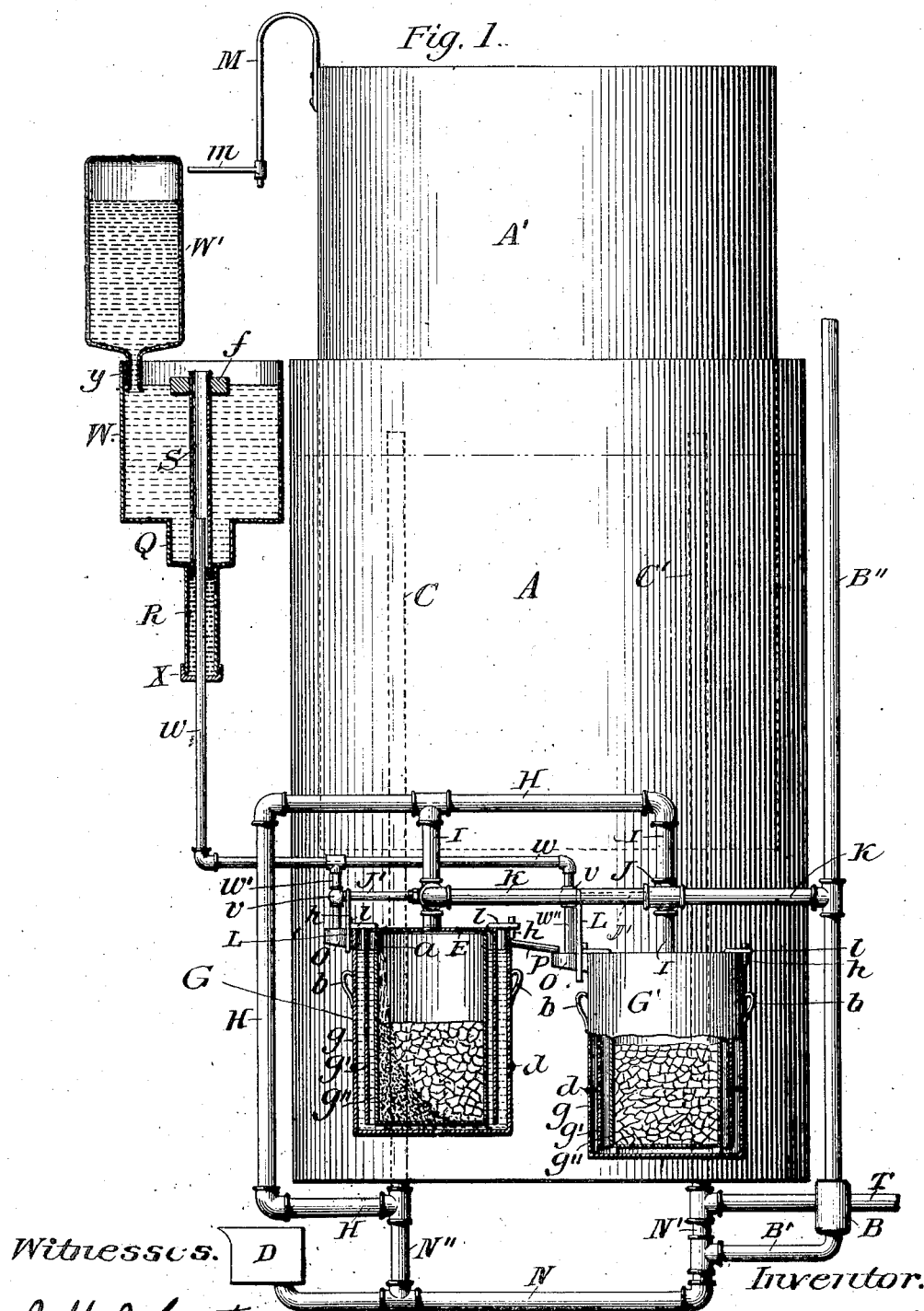
Figure 2:
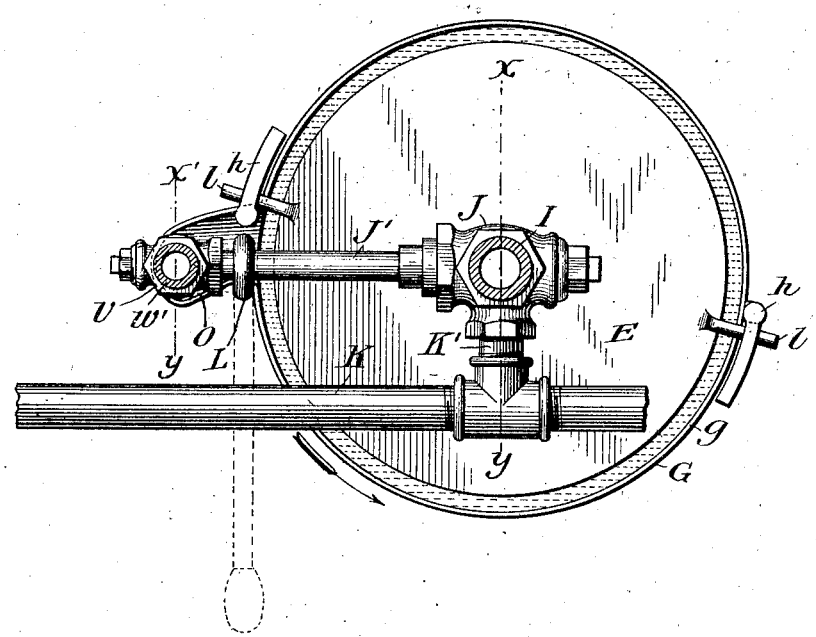
Figure 4:
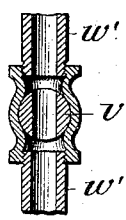
Figure 3:
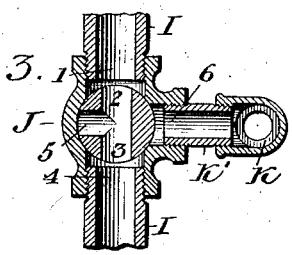

No. 686,876. Patented Nov. 19, 1901.
E. R. ANGELL.
ACETYLENE GAS GENERATOR.
(Application filed Nov. 18, 1899.)
(No Model.) 2 Sheets—Sheet I.

No. 686,876. Patented Nov. 19, 1901.
E. R. ANGELL.
ACETYLENE GAS GENERATOR.
(Application filed Nov. 18, 1899.)

(No Model.) 2 Sheets—Sheet 2.

Witnesses.
E. H. Hall
J. H. Johnston

Inventor.
Edmund R. Angell.

UNITED STATES PATENT OFFICE.

EDMUND R. ANGELL, OF DERRY, NEW HAMPSHIRE.

ACETYLENE-GAS GENERATOR.

SPECIFICATION forming part of Letters Patent No. 686,876, dated November 19, 1901.

Application filed November 18, 1899. Serial No. 737,541. (No model.)

*To all whom it may concern:*

Be it known that I, EDMUND R. ANGELL, of Derry, in the county of Rockingham and State of New Hampshire, have invented a new and Improved Acetylene-Gas Generator, of which the following is a full, clear, and exact description.

My invention comprises a novel form of valve for controlling the flow of water upon the carbid in the carbid-chamber and novel construction of the parts connected with a water-sealed generator, all of which novel features are hereinafter described and claimed.

The apparatus belongs to that class in which the carbid is placed within a number of chambers, which are supplied with water in succession with final flooding, each receiving it intermittently as gas is needed until flooded before the next is brought into action, and the generators are so arranged that while one is in operation any of the others can be removed for recharging.

Reference is to be had to the accompanying drawings, forming a part of this specification, in which—

Figure I is an elevation, partly in section, of the apparatus. Fig. II is a plan view of the generator, valves, and piping connected therewith. Fig. III is a sectional elevation of the three-way valve J in the plane $x\ y$ and at right angles to the pipe K K', and Fig. IV is a sectional elevation of the single-way valve $v$ in the plane $x'\ y'$ and at right angles to the pipe K K.

In connection with my device I use a gasometer of the ordinary construction, consisting of a tank A, which contains water to form a seal, and the gasometer A'. The gas passes from the generators G G' through the pipes I, H, and C into the gasometer A'. It passes from the gasometer through the pipes C' and T to the service-pipe and burners. The pipes C and C' are connected beneath the water-tank A by means of the pipes N, N', and N". These pipes form a seal, and the pipe N, being extended, connects with the drip-cup D, by which the excess of condensed moisture is removed from the apparatus. The pipe B' connects with a bulb B and then with the pipe B", which is to be extended into the external air when the apparatus is installed to convey away to a point of safety any gas which may be generated in excess of the capacity of the gasometer. A blow-off or safety-valve is thus provided. Normally water stands in the bulb B on a level with that in the drip-cup D and lower in the pipes N' and N", according to the gas-pressure; but when the gasometer is fully extended, so that the gas-pressure increases, the surface of the water in N' and N" is depressed, at the same time part of the water rising in the bulb B and part overflowing at the drip D until the gas passes into the pipe B', and, breaking through the water in the bulb B, escapes into the external air. Since the sectional area of the bulb B and of the drip D is much greater than that of the pipes N' and N", but little water escapes at the drip, so that enough remains to restore the seal when the gas-pressure decreases by causing the water to rise sufficiently in the pipes N' and N".

The valve for controlling the flow of water upon the carbid is connected with the water-tank W, which is attached to the large water-tank A. A chamber Q is formed in the bottom of the tank W, and into the bottom of this chamber the pipe R is fastened. A cap X closes the lower end of R. Through the cap X the pipe $w$ passes, having its upper end level with the bottom of the tank W and its lower portion connected with the pipes $w'$ and $w''$. These pipes are provided with valves $v\ v$. The tube S telescopes loosely over the pipe $w$ and within the pipe R. The annular space or chamber between the two pipes $w$ and R contains mercury or any heavy liquid which is immiscible with water. The lower end of the tube S is immersed in the mercury, which forms a seal about it. The upper end of the tube S may be provided with a float $f$, if necessary.

The operation of the valve is as follows: When the gasometer A' settles sufficiently, the disk $m$ on the arm M comes in contact with the top of the tube S and presses it beneath the surface of the water. Water then flows down the tube S into the pipe $w$, and thence through the valve $v$ and pipe $w'$ into the generator G. When the gasometer rises, the buoyant force of the liquids in the tank W and pipe R causes the top of the tube S to rise above the water, and thus stops its flow. The chamber Q serves to receive the mercury which is displaced by the immersion of the tube S, and also receives the float $f$ when the tube is in its lowest position.

For reinforcing the water-supply in the tank W the bottle or pneumatic tank W' is used. If a very large supply is needed, several pneumatic tanks may be connected with the tank W in the same manner. The operation of the pneumatic bottle or tank is obvious. When the surface of the water in the tank W settles sufficiently to admit air through the tube $y$, water flows from the pneumatic tank until the lower end of $y$ is again submerged and the flow ceases.

The generator consists of the pail or outer casing $g$, the cover E, provided with the deep flange $g'$, and the inner pail or carbid-chamber $g''$. The cover E is rigidly attached to the pipe I, from which the whole generator is supported. Between the parts of I a three-way valve J is interposed, and the pipe K connects the third outlet of the three-way valve with the blow-off pipe B''. The pail $g$ has handles $b\ b$, and its top edge is provided with two hooks $h\ h$, diametrically opposite each other, which engage the lugs $l\ l$, correspondingly attached to the cover E. The hooks $h\ h$ point in opposite directions. As arranged in the drawings, the one on the left-hand side of the cover extends downward from the plane of the paper and the right hand one upwardly from the plane of the paper. Consequently in order to hook the pail upon the lugs after lifting it to the proper height it is necessary to give it a rotary motion about its vertical axis by drawing the right hand toward the body and carrying the left one from the body. To remove the pail from the lugs, the motion is reversed. The pail $g$ has a lip $o$ to receive water from the pipe $w'$, and the carbid-chamber $g''$ has a hole near its top edge, at $a$, through which the water flows down upon the carbid. Thus the water supplied to the carbid is caused to pass through the seal and so preserves its integrity. The three-way valve J and the single-way valve $v$ are connected by the common axis J', so that the same lever L operates both at the same time. When the valves are placed rightly for the operation of the generator, the lever L rests against the outer pail $g$ near the back of the hook, and since the horizontally-extending portion of the hook is so long that the pail has to be revolved through a long arc it is impossible to open the generator without first raising the lever L to the horizontal position, which sets the three-way valve J rightly to prevent the return of gas from the gasometer and at the same time shuts off the flow of water into the lip $o$. It also adjusts the three-way valve so there is communication with the generator and outer air through the blow-off pipe B''. This communication is necessary in order to permit the removal of the generator from its seal, as well as to allow connection with the seal, since otherwise the atmospheric pressure would interfere greatly with the operations. By this construction of the valves it is also impossible to let the water flow upon the carbid without first setting the three-way valve so that the gas will enter the gasometer instead of passing into the open air through the blow-off.

The relative position and operation of the valves J and $v$ are better understood by reference to Figs. II, III, and IV. In the plan view, Fig. II, E represents the cover of the generator, and the circle about it the generator-pail, $l\ l$ show the lugs attached to the cover, and $h\ h$ the hooks on the generator-pail. L is the top of the lever, attached to the common axis J' of the two valves J and $v$. K is the pipe which leads to the blow-off pipe B'', and K' connects the valve J with it. O is a portion of the lip of the generator-pail which receives the water as it flows from the pipe $w$. When the generator is detached from its cover, the motion of one of the hooks $h$ in the direction of the arrow comes in contact with the lever L and reminds the operator that the lever must be raised to the horizontal position represented by the broken lines. Its contact with the lower side of the pipe K stops it in the right place. This motion closes the valve $v$, so that the water cannot flow through the pipe $w$, and also adjusts the valve J so that gas cannot flow back from the gas-holder, but so there is communication between the generator and open air through the pipes K', K, and B.'' Fig. III makes plain this adjustment of the valve J. As here shown, it is positioned rightly for the operation of the generator. The ports 2 and 3 of the valve-plug are opposite the holes 1 and 4 of the valve-casing, so there is free passage through the pipe I between generator and gas-holder, but there is no passage from the generator to the pipe K'. When, however, the valve-plug is rotated through a quadrant in the direction of the arrow, the port 5 comes into that part of the pipe I which connects with the generator and the port 3 comes opposite the hole 6 in the valve-casing which opens into the pipe K', and the solid portion of the plug closes that part of the pipe I which connects with the gas-holder. Thus it is obvious that when the lever L is raised into the horizontal position the generator has free communication with the outer air, but the gas-holder has communication with neither outer air nor generator. It is also obvious that however many generators are connected with the pipe K, which really represents the external air, the operation of the three-way valve of each to accomplish the individual results described above is entirely independent of the action of any other and in no way interferes with the operation of any other whether another is operated in a similar manner at the same time or not. Fig. IV represents the position of the single-way valve $v$ when the generator is in operation. When the lever L is placed horizontally, the hole in the plug is at right angles to the passage of the pipe, and so closes it.

The pail $g$ of the generator G is provided with a short pipe P, which extends over the lip on the pail $g$ of the generator G'. To provide for this, the generator G' is placed on a lower level than G. If more than two generators are attached to the apparatus, all but the last one in the series will have a similar pipe and each succeeding one will be placed slightly lower than the one preceding it. In this manner the water can flow in turn from one generator to the next as each becomes exhausted and so continue from the first to the last until all are exhausted. Should it be desirable to recharge any generator while another is in operation—as, for example, the generator G—the lever L is raised to the horizontal position, and the water instead of flowing through this generator into G' passes to it through the pipe $w''$. The outer pail $g$ has a bead around it at $d$ to indicate how much water it should contain before the carbid-chamber is inserted in order to make the seal and yet not enough to cause the seal to overflow into the carbid-chamber when closing the generator.

The manner of recharging is obvious. Raise the lever L to the horizontal position, grasp the handles $b$ $b$, turn the pail $g$ until it can be lowered from its cover, remove the carbid-chamber $g''$ and dispose of its contents, see that the water in the pail $g$ stands no higher than the bead $d$, return the carbid-chamber $g''$ containing the carbid, attach the hooks to the lugs, and press the lever L down against the pail $g$. If water is needed in the tank W, simply pour it in. Fill the pneumatic tanks, if any are used in conjunction with the tank W, and return them to position. If the gasometer is at its lowest point, so that the telescoping tube S is in its lowest position also, water will immediately flow down the pipe $w$ upon the carbid, and the gasometer will rise and also the tube S. If it is desirable not to start the apparatus at once, swing the disk $m$ in a horizontal plane about its axis M until it lets the tube S rise. The apparatus can then be started by pressing the tube S down with the hand, remembering to swing the disk back into working position when it has risen above the tank W.

Having thus fully described my invention, I claim as new and desire to secure by Letters Patent—

1. In acetylene-generators, the combination of a generator containing carbid, a water-tank above the generator and a gasometer connected with the generator, with a valve for controlling the flow of water into the generator, comprising two concentric pipes rigidly attached to each other by the smaller pipe passing through a cap on the lower end of the larger, so as to form an annular chamber between the pipes adapted to contain mercury, the larger pipe having its upper end fastened into the bottom of the water-tank, the smaller pipe having its lower end extended to the generator, and a tube floating concentrically between the pipes, having its lower end sufficiently immersed in the mercury at all times to form a seal and its upper end held above the surface of the water in the tank by the buoyant force of the liquids acting upon the body of the tube, to close the valve, and adapted to be depressed below it by the descent of the gasometer to open the valve, substantially as described.

2. A water-feed valve comprising two concentric pipes rigidly attached to each other by the smaller pipe passing through a cap on the end of the larger pipe so as to form an annular chamber between the pipes adapted to receive mercury, the larger pipe having its opposite end fitted to be fastened into the bottom of a water-containing vessel, and a tube floating concentrically between the pipes in the mercury contained in said annular chamber with its lower end sufficiently immersed at all times therein to form a seal, said tube adapted to be held with its upper end above the surface of the water in the water-containing vessel, by the buoyant force of the liquids, to close the valve, and to be forced into the mercury until its upper end is below the surface of the water, to open the valve, substantially as described.

3. A water-supplying device for acetylene-generators consisting of a water-tank and a pneumatic tank connected therewith, containing water to increase the supply, and a valve controlling the flow of water, comprising two concentrically-located pipes rigidly attached to each other by the smaller pipe passing through a cap on the lower end of the larger, so as to form an annular chamber between the pipes adapted to contain mercury, the larger pipe having its upper end fastened into the bottom of the water-tank, the lower end of the smaller pipe to be extended to the generator, and a tube floating concentrically between the pipes, having its lower end sufficiently immersed in the mercury at all times to form a seal and its upper end to be raised above the surface of the water in the tank by the buoyant force of the liquids acting upon the body of the tube, to close the valve, and means for depressing it below the surface of the water, to open the valve, substantially as described.

4. In acetylene-gas apparatus the combination of a generator, a fixed cover for the same, means by which the generator is compelled to move in a rotary path before separated from the cover, a gas-conveying pipe leading from the generator, a three-way valve therein having a handle, or lever, hanging vertically in the circular path of a projection on the generator whereby when the generator is rotated to separate it from the cover, the valve in the gas-conveying pipe is closed and connection with a blow-off pipe is opened, substantially as described 5. In acetylene gas apparatus, the combination of a generator comprising an outer pail and an inner pail adapted to receive water in the annular space between them, a fixed cover having a depending flange extending into the water in the annular space between the walls of the pails to form a seal, lugs on diametrically opposite sides of the fixed cover, hooks correspondingly attached to the outer pail of the generator to engage the lugs, having their ends extended horizontally and in opposite directions whereby the outer pail of the generator is compelled to move in a rotary path before separated from the cover, a gas-conveying pipe leading from the generator-cover and a valve in said pipe having a handle depending in the path of a projection on said pail whereby when the pail is separated from its cover, the valve is closed by engagement with the hook, substantially as described.

6. An acetylene-gas generator comprising an inner pail and an outer pail adapted to form an annular chamber between them to contain water, a cover having a depending flange extending into the water in the annular space between the walls of the pails to form a seal, said cover being rigidly attached to a gas-conveying pipe from which the whole generator is supported, lugs on diametrically opposite sides of the fixed cover, hooks correspondingly attached to the outer pail of the generator to engage the lugs to fasten the generator to its cover, said hooks having their ends extended horizontally and in opposite directions whereby the outer pail is compelled to move in a rotary path before it can be separated from its cover, the inner pail having a hole in its wall near the top through which water flows from the seal into it, and the outer pail provided with a lip to receive water from the water-supply pipe, and a pipe fastened into its wall near the top, through which water flows into the generator next in the series, substantially as described.

7. In acetylene-gas apparatus the combination of a generator, a fixed cover for the same, means by which the generator is compelled to move in a rotary path before separation from the cover, a water-conveying pipe discharging into the generator, having a valve therein which is operated by a handle hanging in the circular path of a projection on the generator whereby when the generator is rotated to separate it from the cover the valve in the water-conveying pipe is closed, substantially as described.

8. In acetylene-gas apparatus, the combination of a generator comprising an outer pail and an inner pail adapted to receive water in the annular chamber between them, a fixed cover having a depending flange extending into the water in the annular space between the walls of the pails to form a seal, lugs on diametrically opposite sides of the fixed cover, hooks correspondingly attached to the outer pail of the generator to engage the lugs, having their ends extended horizontally and in opposite directions whereby the outer pail is compelled to move in a rotary path before separation from the cover, a gas-conveying pipe leading from the generator-cover, having a three-way valve therein, a water-conveying pipe discharging into the generator having a single-way valve therein, the axes of said valves being in the same line and a handle attached to the common axis of the valves and depending in the circular path of a projection on said outer pail, whereby when the pail is separated from its cover the valve in the gas-conveying pipe is closed, connection with a blow-off pipe opened, and the water-valve closed, substantially as described.

EDMUND R. ANGELL.

Witnesses:
CARMI A. NORTON,
EDWIN H. HALL.